United States Patent [19]
Wickens

[11] 3,903,772
[45] Sept. 9, 1975

[54] SHEET MATERIAL CUTTING MACHINES

[76] Inventor: Charles F. Wickens, 14 The Broadway, Lancing, England

[22] Filed: June 11, 1973

[21] Appl. No.: 368,933

[30] Foreign Application Priority Data
June 20, 1972 United Kingdom............... 28701/72

[52] U.S. Cl. .................. 83/146; 83/916; 83/693; 83/49
[51] Int. Cl............................................ B23d 27/00
[58] Field of Search ........ 83/916, 136, 146, 49, 693

[56] References Cited
UNITED STATES PATENTS

| | | | |
|---|---|---|---|
| 1,958,705 | 5/1934 | Klein................................ | 83/146 X |
| 2,035,448 | 3/1936 | Andersson........................ | 83/916 X |
| 2,364,334 | 12/1944 | Wold................................. | 83/916 X |

*Primary Examiner*—Donald R. Schran
*Attorney, Agent, or Firm*—Irving M. Weiner

[57] ABSTRACT

This invention relates to a machine for cutting thin sheets of metal by a shearing process effected by means of a punch reciprocating in an annular die. The punch is mounted in a tool holder located below the die and the die is rotatably mounted in a die holder. The die forms part of a unitary structure which also includes a stripper joined to the die by a narrow neck.

7 Claims, 4 Drawing Figures

SHEET MATERIAL CUTTING MACHINES

This invention relates to sheet material cutting machines of the kind normally referred to as "nibbling machines." Such machines are designed to cut relatively thin sheets of metal or the like and include a work table and a tool which is reciprocated with respect to the work table so that it removes a relatively small slug from material on the work table at each stroke, by a shearing process.

Sheet material cutting machines of the kind referred to are normally operated with the upper surface of the work table horizontal and any references herein to the location of objects above or below the work table and any use of the words "horizontal" or "vertical" are to be understood as referring to a machine having the upper surface of the work table horizontal.

Most known machines of this kind include an arm fixed above the table in which the tool is reciprocatable, cutting of the material on the work table taking place during the down stroke, i.e. the stroke in which the tool is advanced towards the upper surface of the table. In such machines, the arm forms an obstruction above the table surface and, accordingly, restricts the size of sheet that can be placed on the work table. For this reason, machines have been proposed in which the cutting tool is driven from below the table so that no arm is required above the table.

The invention consists in a sheet material cutting machine including a work table, a die in said work table with its upper face substantially flush with the upper table surface, a cutting tool mounted in a tool holder located below said table surface, driving means for reciprocating said tool holder and said tool along an axis perpendicular to said table surface so that a cutting edge on said tool approaches said die from above during the down stroke of the tool, and stripping means secured against movement along said axis of reciprocation and serving to inhibit upward movement of a workpiece during the upward stroke of the tool.

Preferably, the die is removably fitted in the table and may be generally annular, the axis of the annulus being perpendicular to the table surface and coincident with the axis of reciprocation of the tool and the tool holder. Preferably also, the stripping means is integral with the die. In this case, the stripping means may also be annular and coaxial with the die, the two annuli being spaced apart and joined by a relatively narrow neck. The unitary structure constituting the die and the stripping means is rotatable in the table about the common axis of the two annuli, but is mounted in the table in such a way that it cannot move along said axis. Thus, when the apparatus is in use, the neck joining the two annuli is always located behind the punch from the point of view of the direction of presentation of the workpiece. It will, therefore, be seen that the neck is located in the gap in the material cut out by the punch and, accordingly, must be narrower than the minimum width of the punch.

It may sometimes be found that materials which are suitable for the die are unsuitable for the stripping means and the neck. In this case, it is possible to use a semi-annular die consisting of a hard metal and to provide a separate semi-annular member below the neck to complete the die ring. The said semi-annular member, the neck and the stripping means can then be a unitary structure made from a suitable tough metal. In this case also, it is convenient to use a semi-annular shape for the stripping means, the flat ends of the stripping means being in the same plane as the contacting faces of the die and the semi-annular member.

Preferably, the tool is circular in cross-section and includes two cylindrical portions of equal diameter, separated by an intermediate portion which is recessed relative to the two cylindrical portions. This recessed portion may also be cylindrical, having a diameter less than that of the other two cylindrical portions, but it may be in the form of an inverted, truncated cone. It is to be understood that the cutting edge of such a tool is circular and is located at the lower periphery of the upper cylindrical portion, an annular shoulder being formed at the junction between this upper cylindrical portion and the intermediate portion. Preferably, this shoulder is slightly undercut so that a concave cutting face is formed. The concavity may be produced by grinding and, if the edge of a grinding wheel is used for this purpose, it will be found to be convenient to grind the intermediate portion at the same time with the front face of the grinding wheel so that the taper of the intermediate portion will be the same as the angle of undercut of the cutting face.

It is, of course, to be understood that the outer diameter of the upper cylindrical portion of the tool is so related to the internal diameter of the annular die or of the annulus formed by the semi-annular die and the semi-annular member that the tool is a sliding fit in the die. It is also to be understood that cutting of the sheet material takes place as a result of the shear action occurring as the cutting edge of the tool descends towards the die. The stroke of the tool can be relatively short since it is only necessary for the cutting face to descend a short distance below the upper surface of the die and to rise slightly above the thickest sheet material with which the machine is designed to be used.

To enable the sheared material or slugs to fall away below the die, the inner surface of the die may flare slightly outwardly in the downward direction, and the table, or frame carrying the table, also flares outwardly below the die towards the channel along which the slugs travel under the influence of gravity.

One method of performing the invention will now be described with reference to the accompanying diagrammatic drawings, in which.

Figure 1:
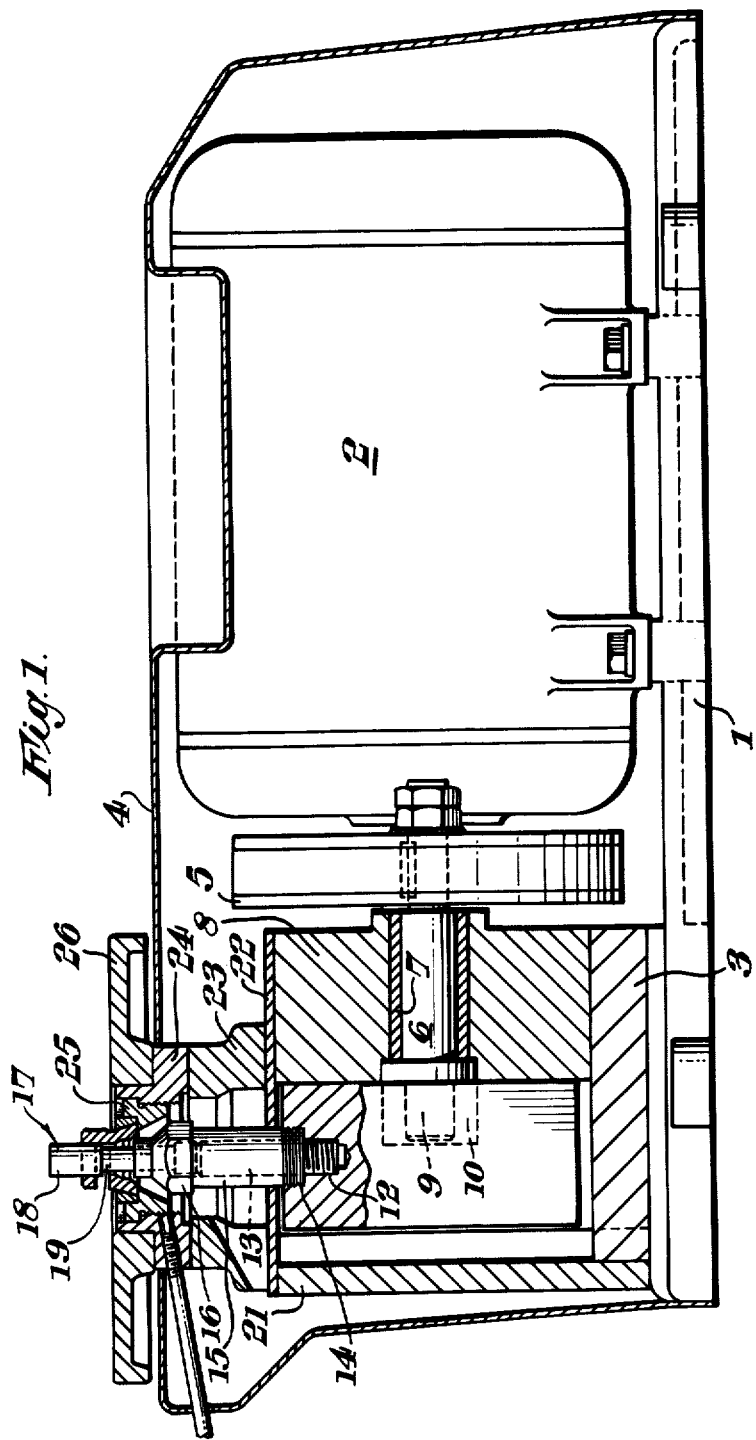
FIG. 1 is a sectional side elevation of a nibbling machine in accordance with the invention.
Figure 2:
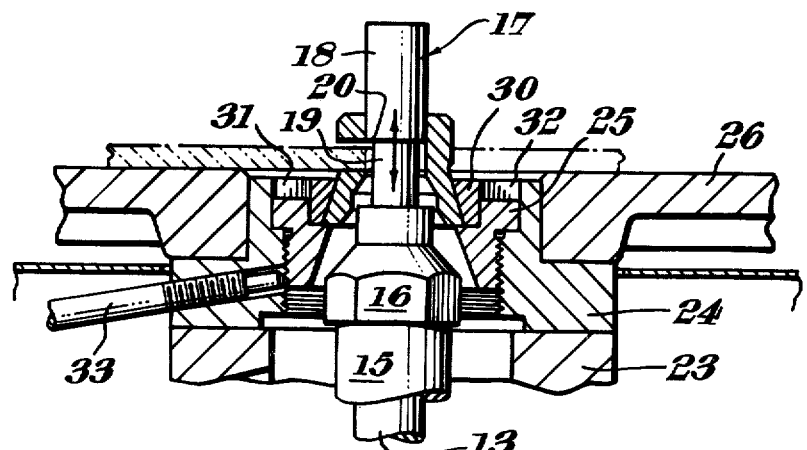
FIG. 2 is a sectional view on an enlarged scale of a part of the machine illustrated in FIG. 1.

The machine illustrated includes a base plate 1 on which are mounted an electric motor 2 and a block 3. All the working parts of the machine with the exception of the motor 2 are mounted on the block 3 and these parts and the motor 2 are protected by a cover 4.

The electric motor 2 is connected through a belt to a pulley 5 mounted on a shaft 6 running in a bearing 7 in a member 8 attached to the block 3. The end of the shaft 6 remote from the pulley 5 is provided with an eccentric pin 9 which is located in a central hole in a crosshead 10 accommodated for sliding movement in a slot in a tool holder 11. The tool holder 11 is mounted for vertical reciprocation with respect to the block 3 and the member 8, and the crosshead 10 is constrained to reciprocate horizontally in the slot in the tool holder. Thus, rotation of the pulley 5 is converted into vertical reciprocation of the tool holder 11.

The upper part of the tool holder 11 is provided with a threaded hole 12 in which is fitted a spigot 13. A larger diameter threaded hole 14 is also provided in the upper part of the tool holder 11 concentric with the hole 12. This larger hole 14 is designed to receive the lower externally threaded end of a tubular member 15, the upper portion of which is formed with a hexagonal head 16. This tubular member 15 co-operates with the spigot 13 to hold a punch 17 in fixed relationship with the tool holder 11. The tubular member 15 can be readily unscrewed with a box spanner when it is necessary to replace the punch 17.

The punch 17 is circular in cross-section and includes two portions of equal diameter, one of which is indicated at 18. These two portions are separated by an intermediate portion 19 which is recessed relative to the other two portions 18. As illustrated, this recessed portion 19 is cylindrical having a diameter less than that of the other two cylindrical portions 18 but it may alternatively be in the form of an inverted truncated cone. The lower edge 20 of the cylindrical portion 18 constitutes the cutting edge of the punch 17.

The block 3 carries a further member 21 which, together with the member 8, serves to support a plate 22 on which is mounted a base 23 for a die holder 25. Permanently attached to the base 23 is a flanged ring 24 which is internally threaded to receive the die holder 25. The flanged ring 24 also serves as a mounting for a table 26.

Figure 3:
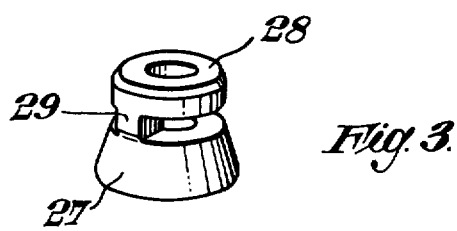
FIG. 3 is a perspective view of a unitary structure comprising the die and the stripper of the machine illustrated in FIGS. 1 and 2.
Figure 4:
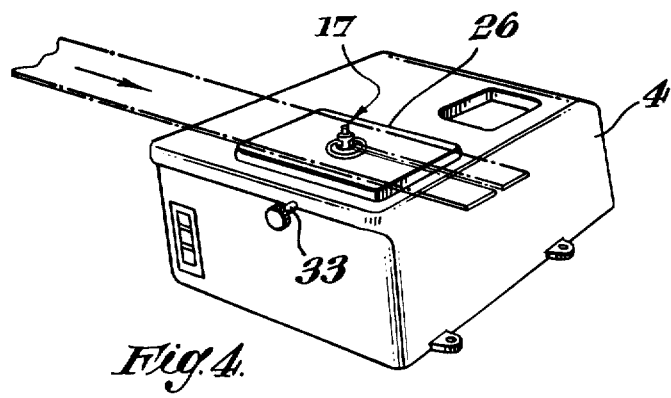
FIG. 4 is a perspective view showing the exterior of the machine.

As can be seen more particularly from FIG. 3, the die and the stripper are formed as a unitary structure consisting of a lower portion 27 constituting the die, an upper portion 28 constituting the stripper, and an intermediate neck 29. It will be seen that the die, is frustoconical, while the stripper 28 is annular, the axis of the annulus being coincident with the axis of the die. The unitary structure is mounted in the die holder 25 by means of a ring 30 which is held in position in the die holder 25 by means of two screws which are not visible in the drawings. The inner surface of the ring 30 is tapered to correspond to the conicity of the die 27 and the dimensions are such that the unitary structure is rotatable in the die holder 25 but is prevented from moving along its axis of rotation. The axis of rotation is, of course, coincident with the axis of the annular stripper 28 and the conical axis of the die 27 and also with the axis of reciprocation of the punch 17. The unitary structure can readily be removed when it has to be changed, by unscrewing the two screws and taking out the ring 30. This ring 30 may be, of course, designed to receive strippers of varying size for varying thicknesses of material to be cut.

To enable the die holder 25 to be screwed into the flanged ring 24, it is provided with two slots 31 and 32 in the upper surface thereof. Further, in order to ensure that the die holder 25 cannot become loose during use of the machine, it is clamped in position by means of a threaded rod 33 which engages in a threaded hole in the ring 24.

Since the top of the work table 26 is free from obstructions, apparatus in accordance with the invention may readily be used for copying from a pattern. Thus, the pattern may be in the form of a top plate mounted by means of a frame on the workpiece which forms the lower plate. Cutting can then be carried out with the lower plate located on the work table 26 and with the edge of the pattern guided by the upper cylindrical portion 18 of the punch 17. It is to be understood that the frame serves to hold the pattern and the workpiece parallel and spaced apart by a distance slightly greater than the distance between the die 27 and the stripper 28. Thus, when the apparatus is in use, the pattern is above the stripper 28 and the workpiece is below the stripper 28. As the frame is manoeuvred to follow the pattern, the die 27 and the stripper are rotated as required by engagement between the neck 29 and the gap cut in the workpiece.

Preferably, separate locking means are provided in the frame for the pattern and the workpiece, and the locking means for the workpiece are made easily releasable so that the workpiece can be fed to position a new piece of material below the pattern after each cut has been completed. In the case of relatively small patterns, a strip of metal may be used for the workpiece and may be slidable in fixed guides in the frame. However, when relatively large patterns are to be cut, the frame is preferably adjustable to receive different sized sheets of metal as the workpiece.

It is to be understood that the invention is not limited to the use of a punch which is circular in cross-section and that the punch may have any desired shape which is suitable for particular applications. In particular, the cross-section of the cutting face may be square and, in this case, the aperture in the die will, of course, also be square. However, to facilitate rotation of the die in the holder the external periphery of the die should always be circular. Alternatively, the die holder 25 must be rotatably mounted in the table 26.

I claim:

1. A sheet material cutting machine including a work table, a die in said work table with its upper face substantially flush with the upper table surface, a cutting tool mounted in a tool holder located below said table surface, a tubular member disposed below said table surface for rigidly securing said cutting tool in said tool holder and being threadedly engaged therewith, driving means for reciprocating said tool holder and said tool along an axis perpendicular to said table surface so that a cutting edge on said tool approaches said die from above during the down stroke of the tool, and stripping means secured against movement along said axis of reciprocation and serving to inhibit upward movement of a workpiece during the upward stroke of the tool, said stripping means being integral with said die, said die and said stripping means being both annular, the two annuli being spaced apart and joined by a relatively narrow neck, the unitary structure constituting said die and said stripping means being rotatable in a die holder fixed with respect to said table about a common axis of said two annuli, the mounting arrangement being such that said unitary structure cannot move along said axis.

2. A machine as claimed in claim 1, wherein the die is frustoconical while the stripping means is cylindrical.

3. A machine as claimed in claim 2, wherein the die is mounted in a die holder by means of a ring, the inner surface of which is tapered to correspond to the external conicity of the die.

4. A machine as claimed in claim 3, wherein said ring is readily removable to enable the unitary structure to be replaced.

5. A machine as claimed in claim 1, wherein the tool is circular in cross-section and includes two cylindrical portions of equal diameter separated by an intermediate portion which is recessed relative to said two cylindrical portions.

6. A machine as claimed in claim 5, wherein the cutting tool is removably mounted in the tool holder.

7. A machine as claimed in claim 6, wherein the cutting tool is secured in the tool holder by means of a tubular member, the lower end of which is threaded to co-operate with a threaded hole in the tool holder.

* * * * *